United States Patent Office 3,796,786
Patented Mar. 12, 1974

3,796,786
PROTECTED LAMINATE ARTICLE AND PROCESS
FOR ITS PREPARATION
Walter T. Koch, Havertown, and Richard A. Glinski,
West Chester, Pa., assignors to FMC Corporation,
Philadelphia, Pa.
No Drawing. Filed July 31, 1972, Ser. No. 276,793
Int. Cl. B29d 7/02
U.S. Cl. 264—331                                    7 Claims

ABSTRACT OF THE DISCLOSURE

A process of preparing a protected resin laminate article from a syrup of an unsaturated polyester and styrene wherein the syrup is placed in contact with a transfer coat on a non-fibrous cellulosic base sheet, is disclosed herein. The transfer coat is of a specified composition in order to maintain its integrity during the forming process, permit eventual release of its carrier sheet, adhere strongly to the laminate article and provide protection for the polyester surface.

---

In the manufacture of plastic articles from styrene monomer modified unsaturated polyester resin, it is necessary to exclude oxygen from the surface of the resin article during the cure. A release sheet of plasticized, non-fibrous cellulose will serve to exclude oxygen from articles wrapped or covered therewith. Articles formed of the monomer modified polyester resin have found extensive application indoors. In outdoor applications, these articles are subject to erosion of the surface producing a weakened and unattractive article.

If a decorative effect is sought on the surface of articles produced from syrups of modified polyester resins, the articles must first be cured and then subjected to a separate printing operation. Decorative effects obtained in this fashion have poor scuff-resistance and poor resistance to the liquids such as oils, alcohols and dilute acids which are encountered in homes, unless additionally coated with a scuff- and solvent-resistant material.

It is an object of this invention to provide an inexpensive method of protecting the surface of styrene modified unsaturated polyester resin articles from solvent attack and/or to provide scuff-resistance.

It is another object of this invention to provide a method for obtaining a coating protected, decoratively finished resin article.

These and other objects are accomplished in accordance with this invention which comprises bringing a syrup of a polymerizable, unsaturated polyester and styrene monomer into contact with the surface of the transfer coating on a composite sheet comprising a non-fibrous, flexible cellulosic base sheet having a continuous transfer coating on at least one side thereof consisting essentially of a resinous copolymer of at least 25 up to about 90 mol percent of an alkylene terephthalate with from 75 to about 10 mol percent of a randomly copolymerized alkylene dicarboxylate, said alkylene groups having from 2 to 10 carbon atoms, or a resinous copolymer of at least 50 up to 95 mol percent of a $C_1$–$C_4$ alkyl methacrylate with from 50 to 5 mol percent of a randomly copolymerized acrylic monomer, said resinous copolymers having softening point ranges of from about 65 to 200° C., and heating the article to cure the unsaturated polyester-styrene monomer syrup in contact with the transfer coating.

This invention is specifically directed to a method involving the use of liquid mixes or syrups of polymerizable, unsaturated polyester and styrene monomer. On curing, the syrups are hardened to a material referred to as styrene modified unsaturated polyester resin. This type of unsaturated polyester is most commonly employed in the preparation of decorative panels used in the manufacture of furniture and cabinets. The resin articles are usually reinforced by incorporating one or more layers of pulp sheets or nonwoven or woven fabrics prepared from glass fibers, synthetic resin fibers, cellulosic fibers, metal fibers and the like in the syrup prior to curing.

Unsaturated polyesters are well known and are prepared by condensing unsaturated polycarboxylic acids and polyhydric alcohols. The acid component is usually an alpha, beta-ethylenically unsaturated polycarboxylic acid, e.g. maleic, fumaric or itaconic acid, their anhydrides and derivatives. A portion of the above acid can be replaced with a saturated aliphatic dicarboxylic acid, e.g., succinic, adipic, sebacic or azelaic acid. Other dicarboxylic acids whcih are considered as the saturated type may also be included in the preparation, e.g., phthalic or terephthalic acid.

The polyhydric alcohol component is usually a glycol, e.g., ethylene glycol, propylene glycol, diethylene glycol and polyethylene glycols.

The unsaturated polyester is a polymerizable liquid material or is liquid when mixed with from 10 to 45% styrene monomer. In addition to styrene, other ethylenically unsaturated copolymerizable monomers can be incorporated in the syrup including, for example, lower alkyl methacrylates and acrylates, and alpha methyl styrene.

The unsaturated polyester syrup may contain various other materials useful for the preparation of shaped articles including, for example, polymerization inhibitors, polymerization initiators, plasticizers, flameproofing agents, dyes and pigments, and particulate or fibrous fillers.

The composite sheets of this invention comprise non-fibrous, flexible cellulosic sheets and a specified resinous transfer coating. The nonfibrous cellulosic sheets include, for example, regenerated cellulose, hydroxyethyl cellulose, hydroxypropyl cellulose, carboxymethyl cellulose, cellulose acetate, cellulose nitrate and the like. From the standpoint of commercial availability and physical properties, regenerated cellulose and hydroxyethyl cellulose films are the preferred base sheets for this invention. In general, these cellulosic sheets must be plasticized to provide the flexibility and durabilty required. A plasticizer of low-volatility is preferably employed to minimize air pollution and smoking during heat curing of the polyester article. Polyethylene glycol having an average molecular weight of from about 200 to about 600 and preferably 300–500 is advantageously used as a plasticizer for regenerated cellulose base sheets. Particulate matter, e.g., microcrystalline cellulose, wood flour, mineral or resin filler, etc. is advantageously incorporated in the cellulosic base sheet during its preparation. The particulate material may be used to control the gloss of the surface of the plastic article. The base film may also carry on its surface an anchoring agent or a release agent depending on the requirements of the coating to be applied.

The base film is coated with a specified resinous layer which must be capable of deposition thereon, must be able to maintain its integrity on contact with the monomer modified polyester syrup, must form an unwrinkled, highly adherent surface on the polyester article and must not adhere so strongly to the base sheet that the base can not be stripped therefrom.

The coatings for this invention include resinous copolymers of at least 25 to about 90 mol percent of an alkylene terephthalate with from 75 to about 10 mol percent of a randomly copolymerized alkylene dicarboxylate. The alkylene groups have from 2 to 10 carbon atoms and preferably from 2 to 4 carbon atoms. The dicarboxylic acids from which the alkylene dicarboxylates are derived include, for example, isophthalic, phthalic, naphthalene dicarboxylic, bibenzoic, oxalic, succinic, glutaric, adipic, pimelic, sebacic, hexadecamethylene dicarboxylic, cyclopentane dicarboxylic and cyclohexane dicarboxylic acids. These polyesters are prepared by any of the well known methods incuding the ester-interchange method and the direct polycondensation method. Preferred resinous copolymers of this type are disclosed in U.S. Pat. No. 2,965,613. More particularly, those copolyesters of 25–90% ethylene terephthalate units and 75–10% ethylene isophthalate units are preferred for higher abrasion resistant coatings.

The resinous acrylic copolymers which are used as transfer coatings for this invention are copolymers of at least 50 up to 95 mol percent of a $C_1$-$C_4$ alkyl methacrylate with from 50 to 5 mol percent of a randomly copolymerized acrylic monomer. Examples of $C_1$-$C_4$ alkyl methacrylates include methyl methacrylate, ethyl methacrylate, propyl methacrylate and butyl methacrylate. Acrylic monomers which are copolymerizable with alkyl methacrylates to form resinous copolymers are well known in the art and include, for example, acrylic and methacrylic acids and their $C_1$-$C_{10}$ alkyl esters, acrylonitriles, acrylamides, and the like. Preferred acrylic resin coatings are those prepared with methyl methacrylate as the major monomer component.

The resinous coatings must have a softening point within the range of from 65 to 200° C. as determined by the Ring and Ball Softening Test–ASTM E28–51T.

The resinous coatings can contain various materials to improve their properties as desired including, for example, slip additives, pigments, decorative fillers, ultraviolet light shielding agents, flame-retardants and the like.

The transfer resinous coatings of this invention are usually applied to the cellulosic base film in the form of organic solvent solutions or as melt extrusion coatings. The coatings may range from about 1.5 to about 25 grams per square inch in weight and should adhere to the cellulosic base sheet with a force of at least 30 grams per inch and no greater than 100 grams, preferably no greater than about 60 grams per inch, as determined by the following test procedure:

TAPE ADHESION TEST

Samples of coated film measuring 8 inches in the machine direction and 3¼ inches in the transverse direction are used. Four samples are used for each test and the results averaged.

A 6 inch length of #610 High Tack tape, 1 inch in width, made by Minnesota Mining and Manufacturing Company, is firmly pressed against the coating of the film sample in the machine direction so that about 2 inches of tape extends beyond the edge on one end of the film. The tape overhang is folded back on itself, sticky side in, to provide a tab. Separation of the coating from the base sheet is started and then the test film extending beyond the tape is cut away to provide a 1 inch by 6 inch test strip.

The force required to strip the coating away from the base sheet is measured by placing the tape tab in one jaw of a Suter Tester and the partially stripped portion of the base sheet in the other jaw. The tester moves at the rate of 12 inches per minute. Thus, a force in grams per inch can be obtained for the test samples.

To obtain the range of adhesion which is necessary for rolling and handling the film and for permitting eventual stripping, some of the coatings can be applied directly to some ordinary plasticized cellulosic films while other coatings or cellulose base film may require either an intermediate release agent or an anchoring agent. Techniques of applying, as well as the chemical nature of various release agents or anchoring agents for cellulosic base sheets are well known in the art and need not be specifically discussed here. In general, release agents which are employed include, for example, the Werner type complex compounds, especially the chromium complex as described in U.S. Pat. No. 2,273,040 and the corresponding aluminum complex compounds. Anchoring agents which are employed, if necessary, include, for example, formaldehyde - melamine precondensates, polyalkyleneimines, and the like.

Decorative lamina, printed designs or indicia as well as solid or multiple pigment colors can and usually are applied to the outer surface of the transfer coating whereupon the decorative matter is locked between the coating and the applied modified unsaturated polyester article when cured.

The following examples are set forth to demonstrate the method of this invention.

EXAMPLE I

A 0.85 mil thick regenerated cellulose film containing 0.5% by weight of a particulate slip agent and plasticized with 14% by weight of polyethylene glycol (average molecular weight of 400) was coated on one side with a 15% solution of a copolymer of from 25 to 90 mol percent ethylene terephthalate and from 75 to 10 mol percent ethylene isophthalate (commercially available under the trademark Vitel PE200) in a solvent mixture of 50% tetrahydrofuran and 50% toluene. The copolymer was film-forming, had an intrinsic viscosity of 0.59 as determined in a 60% phenol-40% tetrachloroethane solution, wt./wt. at 30° C. according to conventional laboratory procedure; and a softening point of 69° C. The solvent was evaporated to obtain a coating of 3.8 grams per square meter on one side of the base film. This transfer coating adhered to the regenerated cellulose base film with a force of about 50 grams per inch. The coating surface was then printed with a wood grain design using a polyamide type ink. The coated film printed side down, was pressed into intimate contact over its entire surface with a fiber glass mat impregnated with a syrup of a polymerizable, unsaturated, polyester resin modified with about 25%, based on the weight of the syrup, of styrene monomer and containing benzoyl peroxide as a catalyst.

The composite article was then passed to a heated zone where it was heated at 260° F. for 5 minutes. After cooling, the regenerated cellulose film was peeled away from the resin article to reveal an unsaturated polyester resin article having a decorative, protected surface. The copolyester transfer coating adhered firmly and smoothly to the cured resin base providing a surface highly resistant to solvent attack.

EXAMPLE II

The regenerated cellulose base film as described in Example I was extrusion coated with a resinous copolymer of from 25 to 90 mol percent ethylene terephthalate and 75 to 10 mol percent ethylene isophthalate (commercially available under the trademark Vitel VMF412). This resin has an intrinsic viscosity of 0.62, a second order transition temperature of 69° C. and a softening point of 181° C. It is partially soluble in hot tetrahydrofuran at a concentration of 5%.

The extrusion conditions for coating the regenerated cellulose film with this resin were as follows:

```
Barrel temperature:
    Rear _____ ° F__ 430
    Front _____ ° F__ 430
Die _____ ° F__ 410
Adapter _____ ° F__ 410
Chill roll _____ ° F__ 200
Chill roll speed _____ ft./min__ 50
Extrusion rate (1½ inch extruder) _____ r.p.m.__ 38
```

A coating of 0.75 mil thickness was obtained on the cellulose film using the above resin and procedure. A force of 35 grams per inch was required in the Tape Adhesion Test to strip the coating from the base film.

The coated side of the composite sheet was printed with a red polyamide ink and the printed film was then pressed printed side into intimate and total contact with a syrup impregnated mat as described in Example I. This construction was then cured at 260° F. for several minutes. After cooling, the regenerated cellulose base sheet was removed so as to leave the printed design firmly adhered between the cured unsaturated polyester panel and the resinous copolyester coating.

EXAMPLE III

The regenerated cellulose base film as described in Example I was coated with an organic solvent solution of an acrylic resin and the solvent evaporated to provide a strippable coating having an adhesion to the base film between 30 and 60 grams per inch in the Tape Adhesion Test. The acrylic resin was a copolymer of 50 to 95 mol percent of a $C_1-C_4$ alkyl methacrylate and 50 to 5 mol percent of a $C_1-C_4$ alkyl acrylate (commercially available under the trademark Acryloid A-11). The resin has a softening point between 65 and 200° C. and a glass transition temperature of 100° C.

The test sheet was then covered by a 10 inches x 10 inches sheet of regenerated cellulose film containing microcrystalline cellulose particles. Each laminate construction was rolled with a rubber roller to remove excess resin and air and then clamped in a set of six inches in diameter embroidery hoops. Each clamped laminate was placed in an oven at 180° F. for 15 minutes and then placed in another oven at 260° F. for 2 minutes. In each case, the hoops were placed in the oven so that the laminate surface made direct contact with the metal oven shelf. Each laminate was then allowed to cool and adhesion of the particular transfer coating to the unsaturated polyester panel was evaluated.

In addition to the above procedure, the effect of styrene monomer on the transfer coating was also evaluated by placing a few drops of the monomer on the surface of the coating or film and observing any immediate changes such as swelling, shrinkage, softening or dissolving.

The results of the above procedure is set forth in the following table:

TABLE I

| Transfer coating resin | Effect of styrene | Adhesion of coating to polyester panel | |
| --- | --- | --- | --- |
| | | Syrup A | Syrup B |
| (1) Polyethylene terephthalate, M.P. 265° C | None | Poor | Poor. |
| (2) Polytetramethylene terephthalate, M.P. 222° C | do | do | Do. |
| (3) Copolymer of 25-90 mol percent ethylene terephthalate and 75-10 mol percent ethylene isophthalate, S.P. 68° C. | Dissolves slowly | Excellent, good appearance | Excellent, good appearance. |
| (4) Copolymer of 25-90 mol percent ethylene terephthalate and 75-10 mol percent ethylene isophthalate, S.P. 181° C. | do | do | Do. |
| (5) Nylon 6, M.P. 218° C | None | Poor | Poor. |
| (6) Polycarbonate, M.P. 267° C | Dissolves rapidly | Excellent, severe coating distortion. | Excellent, severe coating distortion. |
| (7) Polyethylene, M.P. 130° C | Swells, severe distortion | Slight | Poor. |
| (8) Polypropylene (isotactic), M.P. 170° C | Slight swelling | Poor | Do. |
| (9) Polyvinyl chloride (melt extruded) | Swells | do | Slight. |
| (10) Vinylidene chloride acrylonitrile copolymer (melt extruded). | do | do | Poor. |
| (11) Cellulose acetate | None | do | Do. |

NOTE.—M.P.=Melting Point; S.P.=Softening Point.

The coating formulation was as follows:

100 parts by weight of acrylic resin
0.5 parts by weight of clap slip agent
15% coating solids in a solvent of 50 parts butyl acetate and 50 parts toluene This coating composition was applied to the cellulose base film at a solution temperature of 120–130° F. and dried at an oven temperature of 180–200° F. The dried coating weight was about 5.5 grams per square meter of film surface.

The coated surface of the composite film was pressed into intimate contact with a fiber glass mat impregnated with a syrup as described in Example I. The composite article was cured as in Example I and allowed to cool. The regenerated cellulose film was stripped away to provide a cured unsaturated polyester panel having a transparent, scuff-resistant and solvent-resistant coating firmly adhering thereto.

EXAMPLE IV

To demonstrate the specificity of the transfer coating of this invention, the following procedure was followed:

A regenerated cellulose base film as described in Example I was coated with various resins by conventional coating procedures such that a strippable coating resulted.

Unsaturated polyester resin panels were prepared using two different syrups. Syrup A was a polymerizable unsaturated polyester composition containing about 25% styrene monomer and 2% of benzoyl peroxide catalyst while syrup B was the composition of syrup A additionally containing 30% methyl methacrylate monomer based on the weight of the syrup.

Pulp sheets (3 inches x 3 inches) were placed in the syrups overnight. The pulp sheets were removed from the syrups and each was placed in the center of a 10 inches by 10 inches regenerated cellulose film containing microcrystalline cellulose particles. Each pulp was then covered by a sheet (10 inches x 10 inches) of the transfer coated regenerated cellulose film to be tested, coating side down.

From the above results, it can be seen that many resins ordinarily useful as film coatings cannot be used as the transfer coatings for processes of manufacturing protected articles from syrups of unsaturated polyester and styrene or syrups of unsaturated polyester and mixture of styrene and methyl methacrylate. Failure of the transfer coating to achieve good adhesion to the unsaturated polyester article is attributed to either the fact that the transfer coating has a softening or melting point which exceeds the temperature at which polymerization is completed during curing or the coating is either not sufficiently effected by the monomer in the syrup or is effected to too great an extent.

Various changes and modifications may be made in practicing the invention without departing from the spirit and scope thereof and, therefore, the invention is not to be limited except as defined in the appended claims.

We claim:

1. A method of preparing a protected resin laminate article comprising bringing a surface containing a syrup of a polymerizable, unsaturated polyester and styrene monomer into contact with the surface of a transfer coating on a composite sheet comprising a nonfibrous, flexible cellulosic base sheet having a continuous transfer coating on at least one side thereof consisting essentially of a resinous copolymer of at least 25 up to about 90 mol percent of an alkylene terephthalate with from 75 to about 10 mol percent of a randomly copolymerized alkylene dicarboxylate, said alkylene groups having from 2 to 10 carbon atoms, or a resinous copolymer of at least 50 up to 95 mol percent of a $C_1-C_4$ alkyl methacrylate with from 50 to 5 mol percent of a randomly copolymerized acrylic monomer, said resinous copolymers having softening point ranges of from about 65 to 200° C., and heating the article to cure the unsaturated polyester-styrene monomer syrup in contact with the transfer coating.

2. The method of claim 1 wherein the transfer coating is a copolymer of ethylene terephthalate and ethylene isophthalate.

3. The method of claim 1 wherein the transfer coating is a copolymer of a $C_1$–$C_4$ alkyl methacrylate and a $C_1$–$C_4$ alkyl acrylate.

4. The method of claim 1 wherein the cellulosic base sheet contains a particulate matter wherein said particulate matter is microcrystalline cellulose, wood flour, mineral filler or resin filler.

5. The method of claim 1 wherein the cellulosic base sheet is regenerated cellulose.

6. The method of claim 5 wherein the regenerated cellulose contains a plasticizing amount of polyethylene glycol having an average molecular weight in the range of from about 200 to about 600.

7. The method of claim 1 wherein the cellulosic base sheet is thereafter removed to provide a cured unsaturated polyester resin article having a protected surface.

References Cited

UNITED STATES PATENTS

| | | | |
|---|---|---|---|
| 2,901,454 | 8/1959 | Stewart | 117—72 |
| 3,671,007 | 6/1972 | Bailey | 117—72 |
| 3,728,210 | 4/1973 | Piron | 161—406 |
| 3,690,909 | 9/1972 | Finley | 117—161 K |

GEORGE F. LESMES, Primary Examiner

W. R. DIXON, JR., Assistant Examiner

U.S. Cl. X.R.

117—76 P, 145; 156—90, 323, 344; 161—406, 231, 232, 249, 251

UNITED STATES PATENT OFFICE
CERTIFICATE OF CORRECTION

Patent No. 3,796,786          Dated March 12, 1974

Inventor(s) William T. Koch and Richard A. Glinski

It is certified that error appears in the above-identified patent and that said Letters Patent are hereby corrected as shown below:
Col. 2, line 15, "whcih" should read --which--.
Col. 3, line 5, "incuding" should read --including--.
Col. 5, line 40, "clap" should read --clay--; line 67, "307" should read --30%--; line 73, after "pulp" insert --sheet--.

Signed and sealed this 13th day of August 1974.

(SEAL)
Attest:

McCOY M. GIBSON, JR.          C. MARSHALL DANN
Attesting Officer              Commissioner of Patents